United States Patent [19]

Ambros et al.

[11] Patent Number: 4,568,798
[45] Date of Patent: Feb. 4, 1986

[54] X-Y POSITION DETECTOR

[75] Inventors: Peter Ambros, Leutershausen; Hans-Peter Koch, Bad Neustadt; Walter Budig, Wülfershausen; Rudolf Limpert, Strahlungen; Heinz-Jürgen Siede, Bad Neustadt; Gisela Westermeir, Hohenroth, all of Fed. Rep. of Germany

[73] Assignee: Preh Elektrofeinmechanische Werke Jakob Preh Nachf. GmbH & Co., Bad Neustadt, Fed. Rep. of Germany

[21] Appl. No.: 550,706

[22] Filed: Nov. 10, 1983

[30] Foreign Application Priority Data

Nov. 25, 1982 [DE] Fed. Rep. of Germany ....... 3243712
Nov. 25, 1982 [DE] Fed. Rep. of Germany ....... 3243711

[51] Int. Cl.$^4$ ............................................. G08C 21/00
[52] U.S. Cl. ...................................... 178/18; 178/20; 252/511
[58] Field of Search ............................ 178/18, 19, 20; 428/409, 404, 217; 252/511

[56] References Cited

U.S. PATENT DOCUMENTS

| 2,527,835 | 10/1950 | Miller | 178/19 |
| 3,449,516 | 6/1969 | Cameron et al. | 178/18 |
| 3,497,617 | 2/1970 | Ellis | 178/19 |
| 3,697,687 | 10/1972 | Larson et al. | 178/18 |
| 3,699,439 | 10/1972 | Turner | 178/18 |

FOREIGN PATENT DOCUMENTS

| 738414 | 12/1939 | Fed. Rep. of Germany. |
| 1549811 | 6/1971 | Fed. Rep. of Germany. |
| 1965159 | 9/1971 | Fed. Rep. of Germany. |
| 2909847 | 9/1980 | Fed. Rep. of Germany. |
| 3031751 | 4/1982 | Fed. Rep. of Germany. |
| 2615785 | 5/1982 | Fed. Rep. of Germany. |
| 3109286 | 9/1982 | Fed. Rep. of Germany. |
| 3135554 | 4/1983 | Fed. Rep. of Germany. |
| 2720615 | 4/1983 | Fed. Rep. of Germany. |
| 2441219 | 11/1970 | France. |
| 2039875 | 1/1971 | France. |
| 1243478 | 8/1971 | United Kingdom. |
| 1280341 | 5/1972 | United Kingdom. |
| 2087611 | 5/1982 | United Kingdom. |

OTHER PUBLICATIONS

The Review of Scientific Instruments, vol. 41, No. 12, Dec. 1970, "An Electrical Sensor of Plane Coordinates", G. S. Hurst and J. E. Parks.

Primary Examiner—Stafford D. Schreyer
Attorney, Agent, or Firm—Woodcock Washburn Kurtz Mackiewicz & Norris

[57] ABSTRACT

An x-y position detector is shown which comprises a pen and contact plate with a resistive layer formed thereon. Point electrodes are provided on the four sides of the resistive layer. The materials of the resistive layer and the pen are selected such that the pen is in reliable galvanic contact with the resistive layer. The resistive layer is hard and smooth, and permits easy motion of the pen.

The resistive layer consists of carrier particles with a hardness of between 5 and 9 on the Mohs hardness scale, pyrolytically coated with carbon and embedded in a binder whereby the resistive layer is hard and enables easy motion of the pen. The surface on which the pen moves is formed by molding the resistive material on a smooth intermediate substrate.

9 Claims, 4 Drawing Figures

X-Y POSITION DETECTOR

FIELD OF THE INVENTION

The present invention pertains to a device for detecting an x-y position, e.g., of a pen on a contact plate. More particularly, the invention relates to an x-y position detector of the type comprising a flat resistive layer on the four sides of which are arranged electrode devices, wherein a voltage is applied alternatingly to two opposite electrode devices, and each electrode device is formed by several mutually decoupled point electrodes. A pen taps a component voltage corresponding to its position on the resistive layer, and this component voltage is evaluated.

BACKGROUND OF THE INVENTION

X-y position detectors generally as described above are shown in U.S. Pat. No. 3,449,516. There the resistive layer is created by spraying on several layers of graphite film. Such a resistive layer is easily scratched, and the scratches influence the resistance value of the layer, so that it is no longer guaranteed that the component voltage tapped by the pen is analogous to its actual x-y position on the resistive layer. The device thus soon becomes unfit for use. In order to minimize the scratching which is almost unavoidably caused by the pen due to its movement, the ideal of preparing the tip electrode from a soft material, for example, copper, might be suggested. However, the pen tip would be worn off over time due to friction between it and the resistive layer. Moreover, the material worn off also influences the resistance value of the layer, leading to further inaccuracies.

The method of forming the resistive layer according to U.S. Pat. No. 3,449,516 does not provide an adequate smooth surface, because of the multi-layer spraying technique used. This promotes scratching and makes accurate measurement difficult, because along the path of its movement the pen will "jump" over the roughnesses, separating it from the resistive layer. This causes additional contact noise.

A similar device is described in British Pat. No. 12 80 341. In this device the resistive layer is said to consist of a hard wear-resistant material, such as a conducting plastic or a conducting ceramic, or an electrically resistive paper. Such materials can be wear-resistant due to a surface toughness. However, their hardness and smoothness are low, so that surface-generated noise as discussed above can occur in this case as well. In addition, the friction between such a material surface and the pen is high, so that a hard pen slides only with difficulty.

In similar devices, such as shown in West German Auslegeschrift No. 15 49 881 and U.S. Pat. No. 3,497,617, the resistive layer is covered by a hard insulating layer for its protection. The voltage component is then coupled to the electrodes capacitively, rather than galvanically, as in the case of the device of the type discussed above. It is undesirable to apply this additional protective layer over the resistive layer, because fluctuations in the thickness of the protective layer lead to errors in the measurements. In addition, the preparation of the protective layer involves additional cost. Furthermore, capacitive coupling of component voltages of the resistive layer leads to leakage of electric fields in the vicinity of the contact plate, which can lead to errors in voltage measurements.

A process by which a resistive layer with a very smooth surface can be prepared is described in West German Pat. No. 738,414. In that process, the resistive material used to form the resistive layer is applied to an intermediate substrate having a polished surface. After hardening, the resistive layer is attached to its surface on the side opposite the intermediate to a second substrate and the smooth intermediate substrate is removed from the other side. This process is called the reverse laminating technique. Further improvements on the reverse laminating technique are described, for example, in West German Offenlegungsschrift Nos. 30 31 751 and 31 35 554. Resistive layers prepared according to the reverse laminating technique are suitable for use as contact surfaces on which a moving contact slides in potentiometers. The moving contact slides on the potentiometer contact surface with a predetermined contact pressure which need not be excessively high. Therefore, the fact that the hardness of the potentiometer contact surface as prepared using the reverse laminating technique is rather low causes no problems. Such a potentiometer contact surface is not suitable as a resistive layer on which a manually moved pen is moved directly, because due to its relative softness it would become scratched within a short period of time.

Processes for preparing film resistors are described in West German Pat. No. 26 15 785 and in West German Pat. No. 27 20 615. According to those methods, very finely-ground carrier particles are coated with a metal. The coated carrier particles are then coated in carbon, by a pyrolysis process. These particles are then mixed with a binder. The resistive paste thus obtained is applied on a substrate. It was found that a resistive layer prepared using this process becomes extremely hard if the carrier particles consist of silica. Such hard resistive layers are only marginally suitable for potentiometer contact surfaces.

OBJECTS OF THE INVENTION

It is an object of the present invention to provide an x-y position detector, in which the materials of the resistive layer and the pen are selected such that reliable galvanic contact is guaranteed during the manual movement of the pen over the resistive layer, so that the voltage measured by the pen from the resistive layer are proportional to the x and y components or its position, and wherein the pen neither scratches the contact plate nor is abraded, by provision of a resistive layer which is at once hard, abrasion-resistant, smooth and sufficiently low-friction to permit easy motion of the pen.

SUMMARY OF THE INVENTION

The needs of the art and objects of the invention are satisfied by the present invention which provides an x-y position detector, in which the resistive layer consists of carrier particles with a hardness of between 5 and 9 on the Mohs scale. The particles are coated pyrolytically with carbon, and are embedded in a binder and provide a resistive layer which is both hard and slippery. The resistive surface intended for contacting the pen is formed by molding the resistive material on a smooth intermediate substrate. The hardness of the carrier particles determines the hardness of the eventual resistive layer. The hardness of, e.g., silica carrier particles is 7 on the Mohs hardness scale, equivalent to a Knoop hardness value of approximately 820. The carbon coating provides relatively low friction for good sliding ability, so that the pen can be moved over the resistive layer without jerks. The hardness of the resistive layer is so high that the tip of the pen is preferably formed of steel. A steel tip is not abraded by the resistive layer but does not scratch it. The smoothness of the resistive layer is achieved by preparing it according to the reverse lamination process described above. This smoothness in conjunction with the great hardness makes possible the movement of the pen over the resistive layer without jerks, whereby continuous contacting is assured. The component voltages measured in the course of the pen movement shown no incorrect voltage jumps which would be caused by jerks in the pen movement. Another advantage of the reverse laminating technique, which is known per se, namely that the electrically-conducting carrier particles are concentrated on the surface of the resistive layer, also has a favorable effect.

The pyrolytic carbon coating of the carrier particles is known to reduce the temperature coefficient of the resistive layer. This is advantageous as well. As an alternative, the carrier particles can also be coated with a metal compound in addition to the carbon coating. It is found as well that the contact between the resistive layer and the pen is not sensitive to contamination of the resistive layer, which is especially advantageous in the case of exposed resistive layers.

In the preferred embodiment, the pen for contacting the resistive layer is provided with a barrel at the tip of which is arranged a tip electrode electrically insulated from the said barrel, and with a manually operable switching device which generates a scanning signal used to generate signals representative of the x-y position of the pen which can then be supplied to a data acquisition unit. Such a pen is described in West German Offenlegungsschrift No. 29 09 847. In order to be able to move the pen over the resistive layer with a steady hand and to be able to operate the switching device without having to exercise additional pressure on the resistive layer or causing an unwanted displacement of the pen due to operation of the switching device, the barrel is electrically conductive in a preferred embodiment of the present invention. A flat electrically insulated electrode is plated on its outer side. This electrode and the barrel are connected by a switching member which generates the scanning signal as soon as the barrel and the flat electrode are simultaneously touched by the hand.

Further advantageous embodiments of the present invention appear from the following description of an example.

DESCRIPTION OF THE PREFERRED EMBODIMENT

Figure 1:
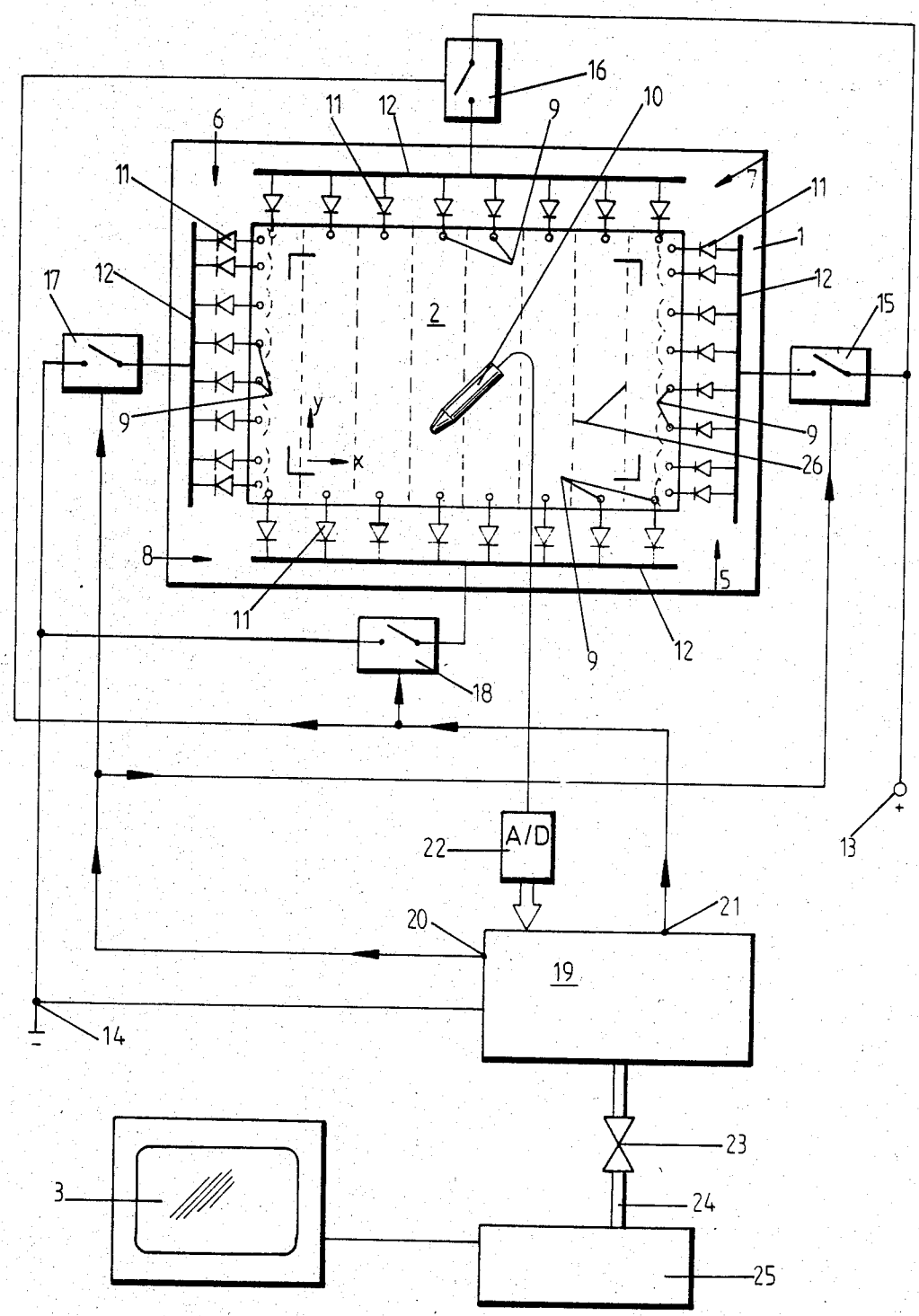
FIG. 1 shows schematically an electric circuit diagram of the x-y position detector according to the invention.

As shown in FIG. 1, a resistive layer 2 is applied on a contact plate 1. The surface of the resistive layer 2 corresponds in its format to the format of a display screen 3. The contact plate 1 consists, for example, of hard paper, epoxy resin or glass.

Figure 2:
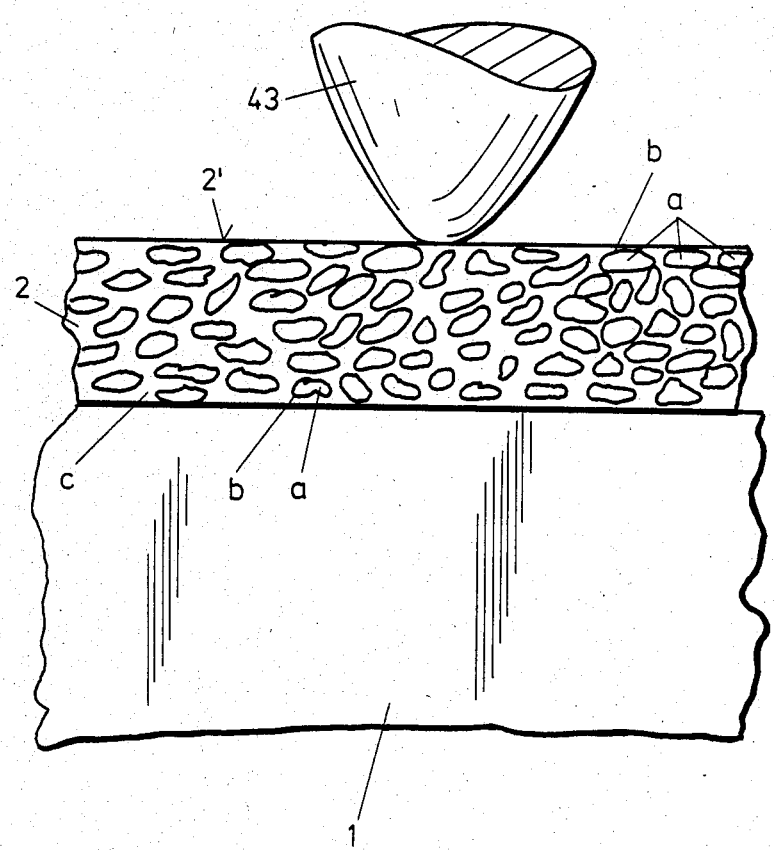
FIG. 2 shows an enlarged cross section detail of the resistive layer with the contact plate.

As shown in FIG. 2, the resistive layer 2 comprises hard, refractory carrier particles a. Their dimensions are on the order of magnitude of 5 $\mu$m. The dimensions are below 20 $\mu$m in all cases. The carrier particles a preferably have a platelike or lentiform shape.

The carrier particles a consist preferably of alumina, silica or alumina-silica. The material used should have a hardness of between 5 and 9 on the Mohs hardness scale.

The particles a are coated with pyrolytically deposited carbon, or with carbon and also with a metal compound. To prepare the coating in the latter case, the particles are first provided with a reducible metal compound which is reduced to metal with a reducing gas at elevated temperature. The metal compound can be an inorganic chemical compound or an organometallic compound. The metal-coated carrier particles a are then provided with a carbon coating b in a pyrolytic process, which protects the metal coating from oxidation.

The coated carrier particles a are then mixed with a binder c. A polymer, for example, melamine-formaldehyde, polyester resin, epoxy resin, polyurethane resin, or acrylic resin can be used as the binder. The mixing ratio is selected approximately such that the resistive layer 2 contains 80 wt.% carrier particles with coating and 20 wt.% binder.

To prepare the resistive layer 2 from the mixture of the carrier particles with the binder, the resistive compound is first applied to a smoothly-polished surface of an intermediate substrate (not shown). After the resistive mass has hardened, the side of the resistive layer not in contact with the immediate substrate is laminated to the contact plate. The intermediate substrate is then removed, exposing the very smooth surface 2' of the resistive layer 2.

As mentioned, the surface 2' of the resistive layer 2 is very smooth; its smoothness corresponding to that of the polished intermediate substrate. The surface 2' is also very hard and mechanically durable. Its hardness is basically equal to the hardness of the carrier particles a. In addition, the surface 2' also permits low friction motion of the pen, as a consequence of the carbon coating b of the carrier particles a. Markings, e.g., fields of orientation marks also can readily be printed on the resistive layer 2, if desired.

Returning to discussion of FIG. 1, electrode devices 5, 6, 7 and 8 are arranged on the four sides of the resistive layer 2. Each electrode device has several point electrodes 9 which are equally spaced along a line. The point electrodes 9 can be printed, evaporated or applied chemically in any convenient manner to the resistive layer 2. The point electrodes 9 can also be etched, or glued. Depending on the production process used, the point electrodes 9 will lie on the resistive layer 2 or between the resistive layer 2 and the contact plate 1.

In the example shown, the point electrodes 9 lie on the resistive layer 2 at a distance from its four sides. This is not essential; the point electrodes 9 may also be formed directly on the four sides, e.g., ends of narrow strip conductors.

Each point electrode 9 is connected via a diode 11 to a junction wire 12 of the corresponding electrode device 5-8. The junction wires 12 typically also arranged atop the contact plate 1.

The device is supplied with direct-current power at a positive pole 13 and a negative pole 14. The junction wires 12 of two adjoining ones 5 and 7 of the electrode devices are connected to the positive pole 13 via electronic switches 15 and 16, respectively. Correspondingly, the junction wires 12 of the other two electrode devices 6 and 8 are connected to the negative pole 14 via electronic switches 17 and 18, respectively. The polarity of diodes 11 of the electrode devices 5 and 6 are arranged such that when the switches 15 and 17 are closed, current flows, in the x direction, from the pole 13 to the pole 14. Similarly, the polarity of diodes 11 of the electrode devices 7 and 8 are arranged in such a way that when the switches 16 and 18 are closed, current flows, in the y direction, from the pole 13 to the pole 14.

The device has a control unit 19 comprising, for example, by a microprocessor. This control unit 19 closes and opens the switches 15 and 17 via a control line 20 alternatingly with opening and closing switches 16 and 18 via a control line 21, so that the switches 15 and 17 are closed when the switches 16 and 18 are open, and the switches 16 and 18 are closed when the switches 15 and 17 are open. This process takes place cyclically, and is repeated, for example, every 20 μsec.

The pen 10 is connected to an analog-digital converter 22 which is connected to the control unit 19. The control unit 19 is connected to a bus 24 communicating with a computer 25, especially a microcomputer, via an interface 23. The computer controls a display screen 3 for any desired purpose, for example, to display a point corresponding to the location of pen 10 on the resistive layer 2; this can be done by comparing the resistances between the pen and the corresponding electrode points 9.

The mode of operation of the device described is approximately the following:

If the switches 15 and 17 are closed, for example, a potential field builds up in the resistive layer 2. Equipotential lines 26 of the field are drawn in dash lines in the figure. They are bulged only in the immediate vicinity of the point electrodes 9. Within orientation marks shown as angles, they are linear and parallel between the lines on which the point electrodes 9 of the electrode devices 5 and 6 lie. The point electrodes 9 of the other electrode devices 7 and 8 do not distort the potential field, within the marks 4, because these point electrodes 9 are decoupled via the diodes 11 of the electrode devices 7 and 8. Any potential which appears on any of these point electrodes 9 is unable to propagate to neighboring point electrodes.

When the switches 15 and 17 are opened and the switches 16 and 18 are closed, the equipotential lines of the field building up are perpendicular to the equipotential lines 26. The diodes 11 of the electrode devices 7 and 8 are not conducting and the diodes 11 of the electrode devices 5 and 6 decouple any potential remaining on corresponding point electrodes 9.

The more densely the point electrodes 9 are arranged, the larger the fraction of the resistive layer 2 in which uniformity of the equipotential lines can be expected. The point electrodes 9 are, on the other hand, not packed too closely to one another, because the voltage necessary to back bias the diodes might not be reached between two adjacent point electrodes. Desirably, the spacing of the point electrodes is on the order of 5–20 millimeters. The ohmic resistance per unit area of the resistive layer 2 is not chosen to be very high, because this would increase the field distortion caused by the point electrodes 9. A resistance of 1 to 10 kOhms per square, as that terminology is generally used in the art, has been found to be favorable.

If the pen 10 with its tip is placed on the resistive layer 2 when the switches 15 and 17 are conducting—i.e., the potential field shown in the drawing exists—a voltage exists on the pen which corresponds to the distance of the pen from the point electrodes 9 of the electrode devices 5 and 6, in the x direction. This voltage component is digitized by the converter 22, and sent to the control unit 19 where it provides an x code. While the pen 10 is still in contact with the resistive layer 2, the switches 15 and 17 are opened under control of controller 19, and the switches 16 and 18 are correspondingly closed so that a voltage is now applied on the pen 10, which corresponds to its distance from the point electrodes 9 of the electrode devices 7 and 8, in the y direction. This voltage component is also digitized in the converter 22 and provides a y code to the control unit 19. The digitized x and y coordinate values are fed into the computer 25 and can, e.g., be displayed by it on the display screen 3, that is, the point corresponding to the position of the pen can be lit on the screen 3.

Of course, the computer 25 can further process the digitized x and y values in any desired way.

The pen 10 and the converter 22 should have a substantially higher ohmic resistance than the resistance of the resistive layer 2, because the pen 10 would otherwise lead to appreciable field distortion.

Since any display screen 3 has a limited number of luminous spots, it is sufficient to select the resolution of the device such that only one luminous spot lights up in any position of the pen. The resolution of the device is selected such that when the pen 10 is moved on the resistive layer 2, consecutive singular luminous spots of the display screen 3 are lighted.

The straight and undistorted equipotential lines 26 permit a straight line drawn with the pen 10 over the resistive layer 2 to be displayed as a straight line on the display screen 3. If, for example, a diagonal is drawn on the resistive layer 2 with the pen 10, this diagonal also appears on the display screen 3.

Using the device described, it is also possible for the user to draw graphics on the resistive layer 2 with the pen 10, to display them proportionally on the display screen 3 and to subject these graphics to any desired further processing by the computer 25. The computer 25 can also support the work of the user with corresponding software as long as the user specifies only one point of a symbol or of a shape whose complete form is then displayed by the computer 25 on the display screen 3.

If identical original basic patterns are to be processed frequently with the device, the resistive layer 2 can be applied to an interchangeable substrate which is separable from the contact plate 1. The resistive layer 2 is imprinted with any desired pattern. This allows different resistor layers with the varying printed patterns to be available to the user for special tasks. Depending on the task to be processed, a user places the corresponding substrate onto the device. The substrate may also be provided with a special coding device. For example, the substrate may be provided with punched aperture coding. The apertures can be scanned, for example, by means of optocouplers after the substrate is placed into the device. The program corresponding to the pattern can then be called by the computer 25.

Figure 3:
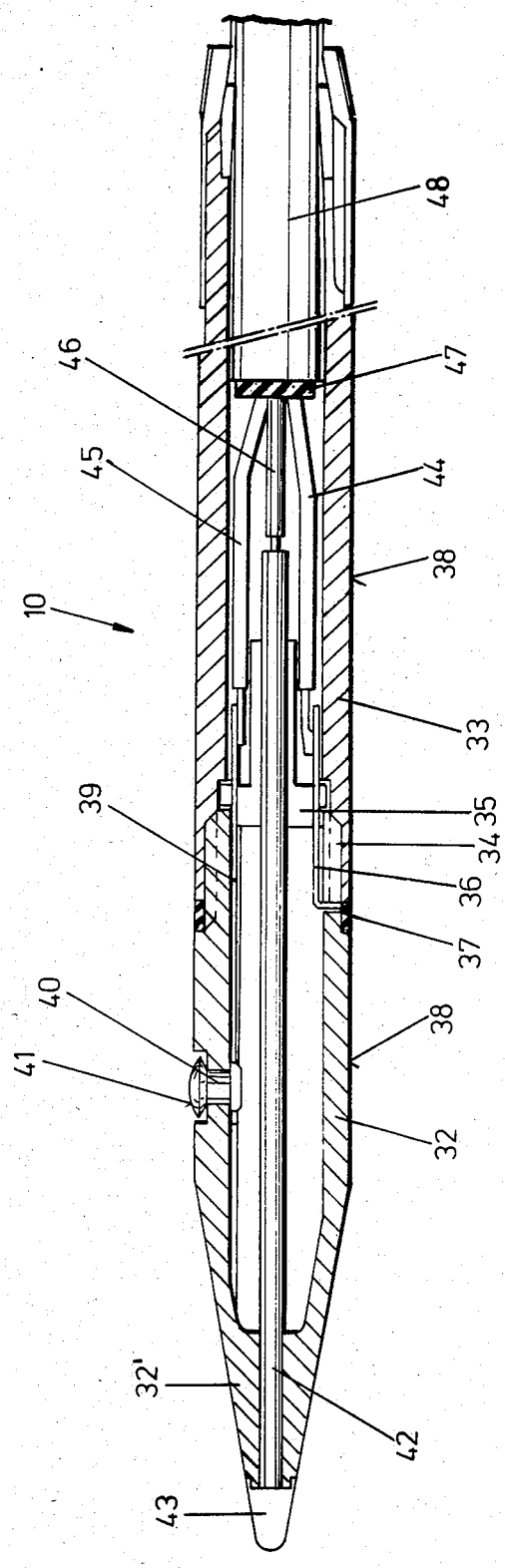
FIG. 3 shows the longitudinal section of a pen of the device.
Figure 4:
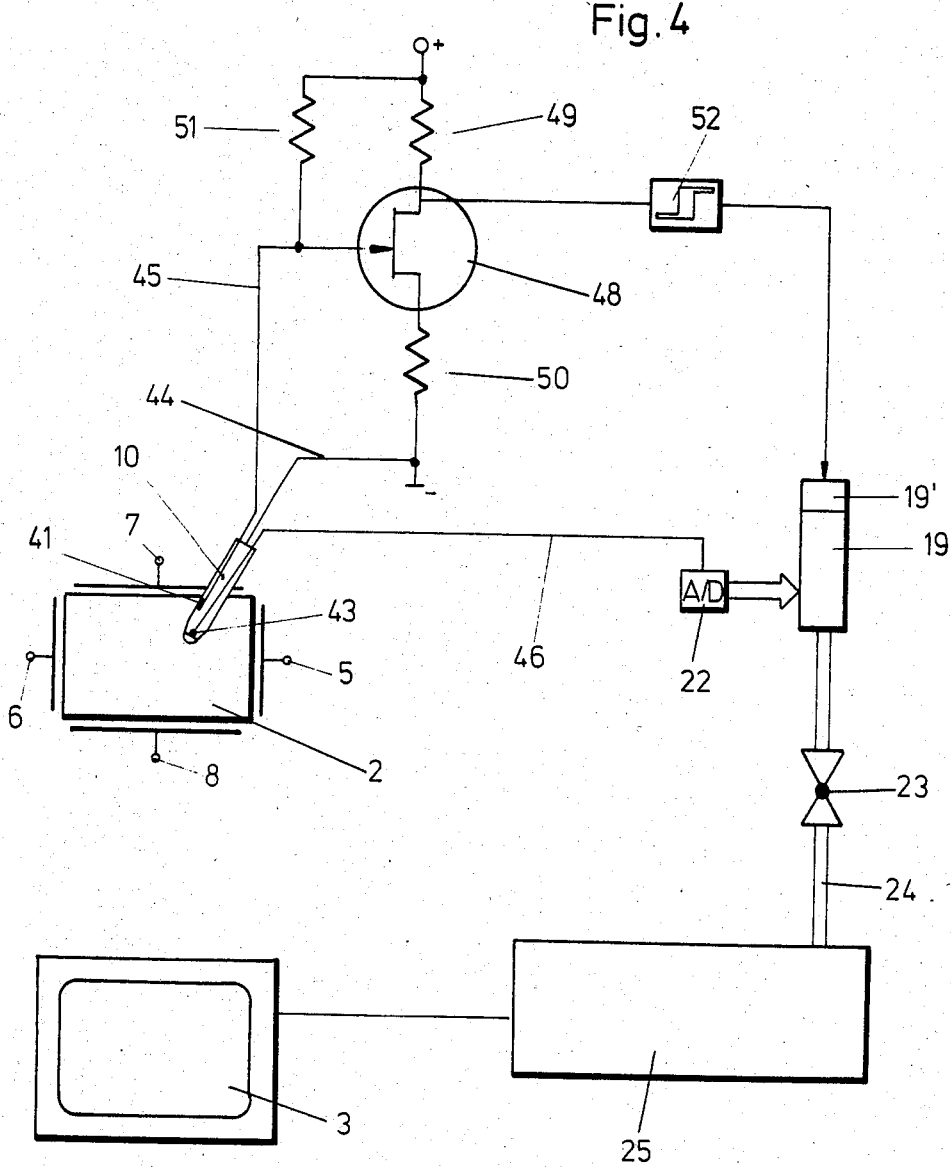
FIG. 4 shows schematically a circuit diagram of the electrical pen connections.

As shown in FIGS. 3 and 4, the pen 10 is designed such that the signals corresponding to its x-y position are detected and further processed only upon a generation of a single by the user rather than steadily.

The pen 10 according to FIG. 3 has nonconducting body members 32 and 33. These are screwed together by a threaded section 34. An insulator 35 is held inside the body 33.

The insulator 35 holds an electrically conductive member 36 terminating in a contact ring 37. An electrically conducting coating 38 is applied to the body members 32 and 33 and is in connection with the contact ring 37.

The insulator 35 also holds a second conductive member 39 which carries a contact pin 40. This pin reaches through the body 32 and forms on its outer side a flat electrode 41 which is not in electrically conducting connection with the coating 38. The flat electrode 41 has approximately the size of a fingertip and is arranged on the body 32 in the area in which the index finger of the user's hand naturally lies. This makes it easy for the user to move the pen 10 on the contact plate 1 like a regular pencil and then to generate the detection signal when desired, using his index finger, to touch the electrode 41, thus forming with his hand a connection between the electrode 41 and collar 37, via coating 38.

To guarantee that the pen 10 lies in the user's hand practically by itself in such a way that the flat electrode 41 is within the reach of the index finger, the bodies 32, 33 are of oval cross section, and the flat electrode 41 is arranged in the area of the minor axis of this oval.

Through the insulator 35 is led a contact pin 42 which is provided with a tip electrode 43 of steel in the zone of the front end 32' of the body 32. The tip electrode does not touch the electrically-conducting coating 38. The tip electrode 43 is rigidly attached to the pen 10.

A three conductor-shielded cable 47 is led out of the pen 10 on the side opposite the tip electrode 43. Its leads 44, 45 and 46 are soldered to the conductors 36 and 39 and to the contact pin 42.

FIG. 4 shows the circuit to which the pen is connected. Lead 45 is connected to the flat electrode 41, and connects it to the gate junction of a field-effect transistor 48 whose drain and source junctions are connected to a supply voltage and ground via resistors 49 and 50, respectively. Bias voltage is applied to the gate junction via a resistor 51. Lead 44 is connected to the ground potential of the resistor 50. A threshold value switch 52, which sends the detection signal generated upon pressing the button electrode 41 to a processor controlled 19' on the control unit 19, is connected to the drain junction of the field-effect transistor 48.

The mode of operation of the pen 10 is thus as follows:

The user brings the pen 10 into the desired position while its tip electrode 43 is loosely sliding on the resistive layer 2 on the contact plate 1. In the desired position the user touches the flat electrode 41 with his hand. He does not need to exercise any excessive pressure on the resistive layer 2 of the contact plate 1 to do so. The user is also less likely to scratch the resistive layer 2 with the tip electrode 43, because the layer is not coupled with the switching device.

The pen structure shown provides the additional advantage that the user needs only one hand to seek the desired position on the contact plate 1 and generate the detection signal. Consequently, for example, he does not have to move the pen 10 with one hand and generate the detection signal, e.g., on a keyboard of the data acquisition unit, with his other hand.

The tip electrode 43 effectively senses the voltage components between it and the electrode devices 5 through 8. These voltages are sent to the control unit 19 in digitized form via the lead 46 and the analog-digital converter 22. The field-effect transistor 48 becomes conducting due to the user touching the flat electrode 41 with the index finger of this hand, which is simultaneously in contact with the coating 38 on the body members 32 and 33 of the pen 10. When conducting, the field-effect transistor 48 sends a detection signal to the processor controller 19' via the threshold switch 32. The digitized x-y position signals are then sent to the data acquisition device 25. A display indicating the actual path of movement of the pen 10 on the contact plate 1, is then displayed on the display screen 3. Various other processes using the actual position of the pen as input can also be initiated in the data acquisition unit 25.

Since the user need not exert any additional pressure on the pen 10 when touching the flat electrode 41, the pressure of the tip electrode 43 on the contact plate 1 is not increased. It is therefore possible to design the contact surface of the tip electrode 43 to be very small which makes a high resolution of the possible positions of the tip electrode 43 possible.

While a preferred embodiment of the invention has been described, it will be appreciated that alternatives are possible, and that the scope of the invention is to be limited only by the following claims.

We claim:

1. An x-y position detector for detecting a position of a pen on a four-sided contact plate comprising a resistive layer having two opposed pairs of electrode devices on the four sides, said electrode devices each comprising several mutually decoupled point electrodes, wherein a voltage is applied alternatingly to two opposite pairs of electrode devices and the pen taps voltage components corresponding to its position on the resistive layer, characterized in that the resistive layer consists of 80 weight % of carrier particles incorporated in 20 weight % of a binder wherein the carrier particles consist of silica in a platelike shape, said particles having a hardness of between 5 and 9 in the Mohs hardness scale and a particle size of predominantly 5 $\mu$m, and said particles being coated with a metal compound and pyrolytic carbon and embedded in the binder, such that the resistive layer is hard and permits easy motion of said pen on its surface, and such that the surface of the resistive layer which is provided for the pen movement is made smooth.

2. A device according to claim 1, characterized in that the pen has a tip of steel.

3. Device according to claim 1, further comprising control unit means for cyclically applying a direct-current voltage to the two pairs of electrode devices, and semiconductor switch means connected in series with the electrode devices, said control unit means cyclically receiving voltage components tapped by the pen.

4. The device of claim 3 further comprising analog/-digital converter means for digitizing the voltage components tapped by the pen.

5. Device according to claim 1, characterized in that the resistive layer is applied on an interchangeable substrate which is separated from the contact plate.

6. Device according to claim 1, characterized in that the point electrodes are separated such that no current flows between them when there is potential difference between them.

7. A device according to claim 1 wherein the pen has a barrel having an electrically conductive outer surface, an electrically insulated tip electrode, and a manually operated switching device which generates a detection signal which causes the x-y position of the pen to be sent to a data acquisition device, characterized in that the tip electrode is attached to the barrel independently of the switching device, and an electrically isolated flat electrode is arranged on the barrel's outer surface, whereby the flat electrode and the barrel are connected when the barrel and the flat electrode are simultaneously touched by the hand of a user.

8. Pen according to claim 7, characterized in that the flat electrode is approximately the size of a fingertip and is arranged in an area of the barrel for convenient contact by the index finger of the user.

9. A method of forming a resistive plate for galvanic contact with a pen movable with respect thereto comprising the steps of (1) pyrolytically coating silica carrier particles with carbon and with a metal compound, said silica carrier particles having a platelike shape, a hardness of between 5 and 9 on the Mohs scale, and a particle size of predominantly 5 $\mu$m, (2) mixing 80 weight % of said coated particles and 20 weight % of a binder, and (3) molding the resultant mixture against a smooth intermediate substrate.

* * * * *

UNITED STATES PATENT AND TRADEMARK OFFICE
CERTIFICATE OF CORRECTION

PATENT NO. : 4,568,798
DATED : February 4, 1986
INVENTOR(S) : Peter Ambros et al It is certified that error appears in the above-identified patent and that said Letters Patent is hereby corrected as shown below:

In Column 3, line 13, the word "shown" should be --show--.

Signed and Sealed this

Thirteenth Day of May 1986

[SEAL]

Attest:

DONALD J. QUIGG

Attesting Officer

Commissioner of Patents and Trademarks